(12) United States Patent
El-Wakeel et al.

(10) Patent No.: US 10,113,330 B2
(45) Date of Patent: Oct. 30, 2018

(54) EXPANDABLE MAT-BASED SUN SHELTER

(71) Applicant: Imam Abdulrahman Bin Faisal University, Dammam (SA)

(72) Inventors: Hala El-Wakeel, Dammam (SA); Fatima Al Doukhi, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 15/810,944

(22) Filed: Nov. 13, 2017

(65) Prior Publication Data

US 2018/0274261 A1   Sep. 27, 2018

Related U.S. Application Data

(60) Provisional application No. 62/474,144, filed on Mar. 21, 2017.

(51) Int. Cl.
*E04H 15/54* (2006.01)
*E04H 15/56* (2006.01)
*E04H 15/40* (2006.01)

(52) U.S. Cl.
CPC ............. *E04H 15/54* (2013.01); *E04H 15/40* (2013.01); *E04H 15/56* (2013.01)

(58) Field of Classification Search
CPC ................................ E04H 15/54; E04H 15/56
See application file for complete search history.

(56) References Cited

U.S. PATENT DOCUMENTS

| | | | |
|---|---|---|---|
| 1,169,702 A | 1/1916 | Washburn | |
| 2,266,853 A * | 12/1941 | Dabney | E04H 15/003 135/116 |
| 2,990,923 A | 7/1961 | Macias-Sarria | |
| 5,059,463 A * | 10/1991 | Peters | A47G 9/06 135/116 |
| 6,199,229 B1 * | 3/2001 | Wong | E04H 15/006 135/125 |
| 6,848,460 B2 * | 2/2005 | Zheng | E04H 15/324 135/126 |
| 7,578,306 B2 * | 8/2009 | Mettavant | E04H 15/16 135/119 |
| 7,673,642 B1 | 3/2010 | Shires | |

(Continued)

OTHER PUBLICATIONS

Cathy Strongman, "'Swoosh' Pavilion Swoops Into View at the AA," Jun. 27, 2008, 7 Pages. http://www.bdonline.co.uk/swoosh-pavilion-swoops-into-view-at-the-aa/3116685.article.

(Continued)

*Primary Examiner* — Noah Chandler Hawk
(74) *Attorney, Agent, or Firm* — Oblon, McClelland, Maier & Neustadt, L.L.P.

(57) ABSTRACT

A collapsible sun shelter that includes an arch support and a rollable flat mat that is configured to expand to include a canopy section and further includes a floor area portion, an upwardly deployable area portion at least two mat anchor points and at least two arch support openings. The rollable mat has an upwardly deployable area portion defined by an outer perimeter passing through at least one layer of the rollable flat mat such that the upwardly deployable area portion remains connected with the floor area portion when the upwardly deployable area portion is extended upwardly in a deployed configuration.

9 Claims, 6 Drawing Sheets

(56) References Cited

U.S. PATENT DOCUMENTS 9,788,658 B2 * 10/2017 King-O'Connor ...... A47C 7/66

OTHER PUBLICATIONS

Google Search, "Foldable Canopy+Honeycomb Structure+Arc Support," 1 Page. https://www.google.co.in/search?q=foldable+canopy+%2B+honeycomb+structure+%2B+arc+support&safe=active&tbm=isch&tbs=rimg:CRWoHCnJI2Y1ljgbdEwpji_1mfzyat_1zaExal8xYsH04971CJvTd3Dz8fBunLDNEU53MYtjqFa2jekwaDuHBQe2DCRioSCRt0TCmOL-Z_1Eaf60AxibCECKhIJPJq3_1NoTFqURjV-3h2uX19oqEgnzFiwfTj3vUBGhNWbSpRCd7CoSCYm9N3cPPx8GETSI4e1JHB1NKhlJ6csMORTncxgRn7zbbjYxmaYqEgm2OoVraN6TBhFWOt-qb0WXcCoSCYO4cFB7YMJGEWld59fbdp27&tbo=u&sa=X&ved=0ahUKEwjU_ue1o57TAhUJuo8KHfhoAsYQ9C8IGw&biw=1280&bih=904&dpr=1#imgrc=FagcKcmXZjWnIM.

AA Design+Make, "AA Summer Pavilions," Jun. 5, 2014, 2 Pages. http://designandmake.aaschool.ac.uk/aa-summer-pavilions/.

* cited by examiner

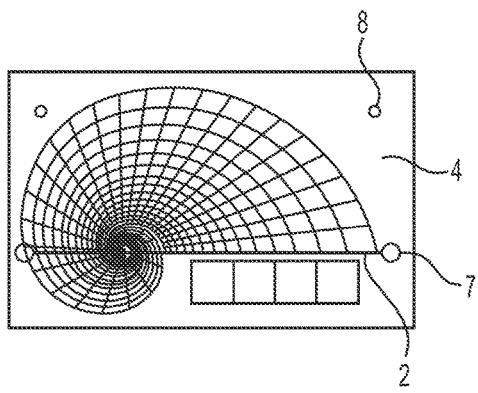
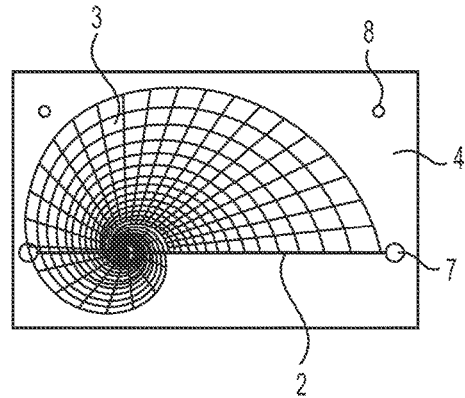
FIG. 3A     FIG. 3B
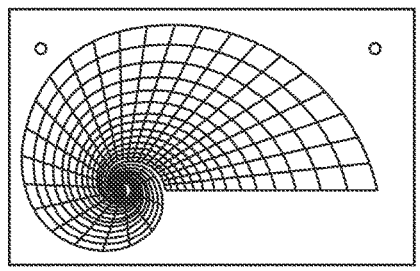
FIG. 3C     FIG. 3D

EXPANDABLE MAT-BASED SUN SHELTER

CROSS-REFERENCE TO RELATED APPLICATIONS

The present application claims priority to U.S. Provisional Application 62/474,144, having a filing date of Mar. 21, 2017, incorporated herein by reference in its entirety.

BACKGROUND OF THE INVENTION

Field of the Invention

The present disclosure relates to an expandable and collapsible sun shelter that is easily storable and transportable as a rollable mat portion and an extendable arch portion.

Description of the Related Art

Arid regions of the world and localities that experience extreme temperature often do not have ready sources of shade that are common in more temperate climates, such as trees. Throughout recorded history individuals passing through such areas have relied on temporary shade structures or sun shelters to provide relief from direct exposure to sunlight. Especially for travelers or temporary visitors to such areas, the ability to efficiently transport and stow sun shelters has been crucial to their usefulness.

Conventional sun shelters are similar in some respects to expandable canopies or tent structures. Tent structures have the advantage of being able to provide a protected space for privacy but thereby have restricted visibility to the outside. Further, tent structures are often difficult to erect and cumbersome to transport. Canopy structures such as folding umbrellas are alternately used for temporary sun shading purposes. However such structures are also difficult to transport and stow and are generally not considered to be a practical alternative for quick and efficient travel by foot or caravan.

Ease of deployment is of crucial importance to sun shelter structures. Tent structures are complex and require significant time for erection and deployment. While simple structures such as tarps or naturally occurring elements such as palm fronds are easy to erect, they lack the ability to resist the elements such as wind and/or degrade quickly under extreme exposure to sunlight.

SUMMARY OF THE INVENTION

In one aspect the present disclosure relates to a sun shelter that is both transportable and easily stowable. The sun shelter includes a mat-based portion that is rollable and easily stowable and that functions as a canopy portion when expanded. The mat-based portion may also serve the purpose of providing ground cover.

In another aspect the present disclosure includes a collapsible sun shelter that includes an arch support and a canopy section.

In another aspect the canopy section is configured to collapse to a rollable flat mat having a floor area portion, an upwardly deployable area portion, at least two mat anchor points and at least two arch support openings.

In another aspect a mat has an upwardly deployable area portion defined by an outer perimeter cut through at least one layer of the rollable flat mat such that the upwardly deployable area portion remains connected with the floor area portion when deployed.

In another aspect the present disclosure an upwardly expandable rollable flat mat is made from a biaxially oriented extruded film of a polyolefin material.

In another aspect the present disclosure relates to a rollable flat mat made from a biaxially oriented extruded film of a polyolefin material

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3A shows a top view of a mat-based expandable sun shelter in an expanded or deployed configuration.

FIG. 3B shows a top level view of an expandable sun shelter.

FIG. 3C shows an expandable sun shelter canopy in a flat or mat form with an arch support removed.

FIG. 3D shows a top level view of a canopy portion of a sun shelter or sun shelter system in a rolled configuration.

DETAILED DESCRIPTION OF THE PREFERRED EMBODIMENTS

Figure 1:
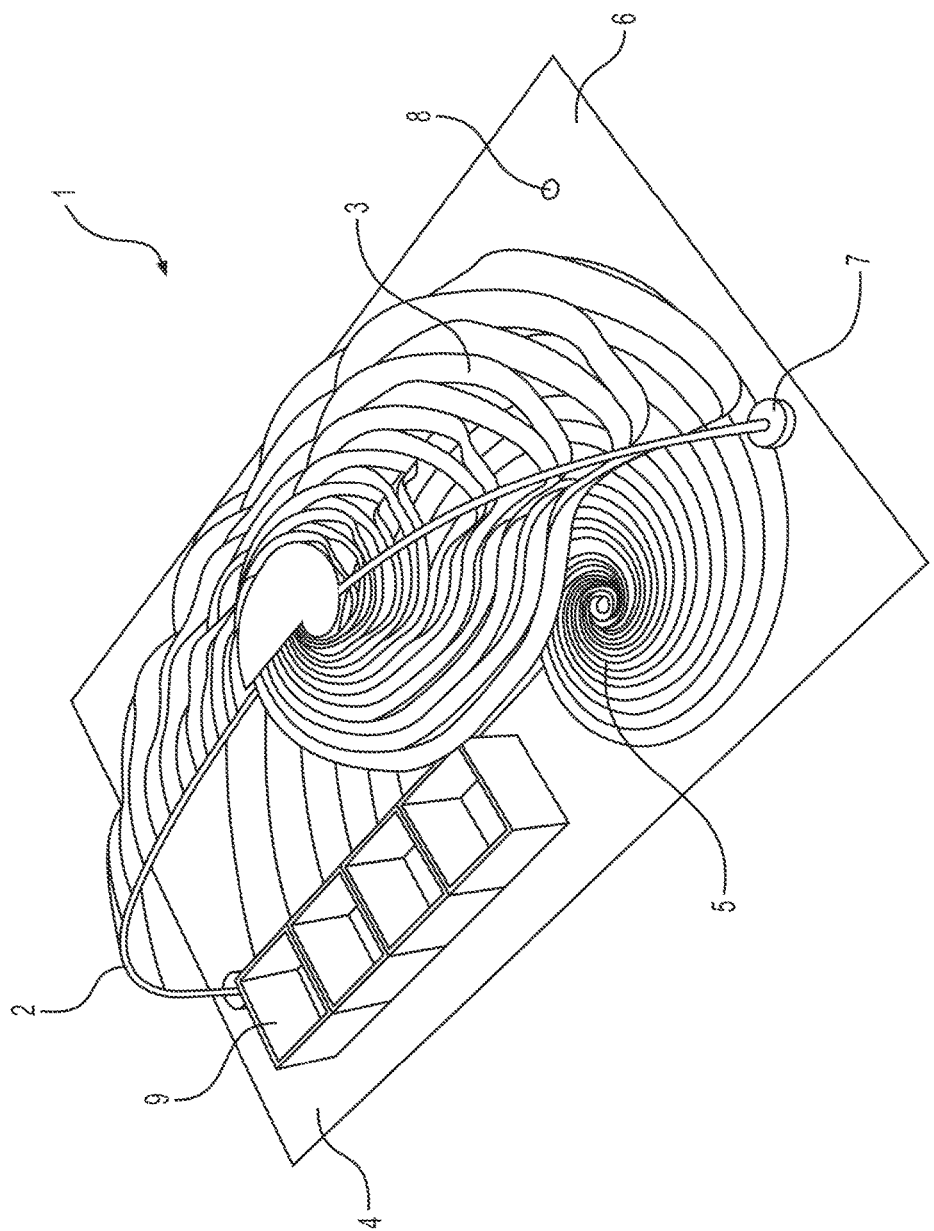
FIG. 1 shows an embodiment of a sun shelter in a deployed configuration.

Aspects and embodiments of the present disclosure will now be described more fully with reference to the accompanying drawings, in which some, but not all of the embodiments of the disclosure are shown. In addition, the present disclosure will be understood with reference to the following definitions.

As used herein, the words "a" and "an" and the like carry the meaning of "one or more". With the description of this disclosure, where a numerical limit or range is stated, the end points are included unless stated otherwise. Also, all values and sub-values including subranges within a numerical limit or range are specifically included as explicitly written out.

The term "comprising" is considered an open-ended term synonymous with terms such as including, containing or having and is used herein to describe aspects of the invention which may include additional components, functionality and/or structure. Terms such as "consisting essentially of" are used to identify aspects of the disclosure which exclude particular components that are not explicitly recited in the claim but would otherwise have a material effect on the basic and novel properties of the disclosure. Basic and novel properties of the present disclosure include the collapsibility of an expandable mat-based structure, suitability of the expandable structure for shading and shelter, suitability of the expandable structure for transport and stowage and suitability of the expandable structure for exposure to extreme sunlight and outdoor exposure. The term "consisting of" describes aspects of the invention in which only those features explicitly recited in the claims are included and thus other components not explicitly or inherently included in the claim are excluded.

The present disclosure includes an expandable sun shelter that is useful for providing shade and shelter from direct sunlight and solar rays. The sun shelter is easily stowable and transportable by collapsing from an expanded or deployed configuration to a collapsed configuration. In a preferred embodiment the sun shelter is collapsible to two pieces including a rollable mat and an extendable tension bar or arch support.

The sun shelter includes a canopy section (derived from the rollable mat) and an arch support (derived from the extendable tension support) when in an expanded or deployed configuration. The canopy section blocks sunlight and/or solar rays from an area thereby providing a shaded area for protection from direct exposure to sunlight or solar rays. The canopy section is supported by the arch support when in an expanded or deployed configuration. The canopy section is expanded from a collapsed configuration to an elevated or expanded configuration that is held in an expanded or elevated configuration by the arch support.

The canopy section is preferably a mat-based canopy section that consists of a single mat, unibody or single flat section that is rollable or easily foldable for storage. The canopy section represents a portion of a shaped mat that can be extended upwardly and outwardly from the plane defining the top surface of the mat when in a collapsed and unrolled configuration. The upwardly deployable area portion of the mat remains connected to the mat structure and a floor area portion of the mat during deployment or expansion and during collapsed configuration or when the mat is rolled for stowage or transport.

In one aspect of the disclosure the upwardly deployable area portion is defined by a perimeter that is cut into a rollable flat mat. The upwardly deployable area portion is not cut out but instead remains an integral part of the flat mat when extended and/or expanded, accordion-like, from the surface of the rollable flat mat. As the upwardly deployable area portion is extended and deployed, it is held in place in an elevated position with the arch support. The arch support serves the purpose of holding or supporting the upwardly deployable area portion of the rollable flat mat to thereby elevate it and provide an area below it that is covered and shaded from direct exposure to sunlight and solar rays.

The arch support is preferably a collapsible tension bar that extends across an approximate width or length of the rollable flat mat. It is preferably a straight bar-like tension support device having a length greater than the length or width of the rollable flat mat when extended. The arch support may alternately be collapsible into sections such as the sections of a collapsible umbrella handle or tent pole. Preferably collapsible sections are connected to one another with an elastic cord to prevent loss of a particular section. The arch support is bendable to form an arch that crosses a major portion of a width or length of the rollable flat mat. Bending (e.g., arching during deployment) provides tension and torsion across the length of the arch support when used to deploy the canopy.

The arch may be connected with the upwardly deployable area portion of the rollable flat mat at one or more points. Preferably the arch support, in an expanded configuration, is at least temporarily connected to a plurality of points along the deployable area portion. The arch support may be connected to the upwardly deployable area portion by mechanical devices or through slots formed in the rollable flat mat. For example the arch support may be weaved through portions of the canopy section of the sun shelter.

The ends of the arch support fit into anchors on either side of a length or width of the rollable flat mat. In order to accommodate passage of the ends of the arch support, the rollable flat mat may have holes greater than or corresponding to a width of the arch support ends. The ends of the arch support are placed in anchors which may be integral with the rollable flat mat at the arch support openings.

The sun shelter is deployed by stringing, connecting or hanging the arch support through the connection devices or through slots along the upwardly deployable area portion of the rollable flat mat. One end of the arch support is then inserted through an arch support opening and anchored. The second end of the arch support is then inserted into the second anchor point thereby forming an arch crossing the width or length of the rollable flat mat to elevate or lift the upwardly deployable area portion into an elevated position. Elevation of the upwardly deployable area portion forms a shaded area underneath for protection from direct exposure to sunlight or solar rays.

The rollable flat mat may have further anchor points or anchor support openings to permit direct anchorage of the rollable flat mat, separately from the anchors used to secure the arch supports, onto a substrate. Such anchorage reduces and/or minimizes risk that the sun shelter is lost in high winds or is otherwise disturbed by environmental factors or by movement of individuals taking shelter.

The rollable flat mat may be formed of a material that permits folding and/or rolling. Such materials may include fabrics; woven, non-woven and knit. Preferably the rollable flat mat and the canopy section thereof are made of a thermoplastic polymer having sufficient stiffness, rigidity and flexural modulus to permit extension and vertical expansion during deployment while concurrently providing horizontal rigidity to maximize blockage of sunlight. In one aspect the rollable flat mat is made of a polyolefin material and/or a polyolefin elastomer that may be filled or unfilled. The material is selected such that it is flexible and easily bendable in an orientation upwards and outwardly from the surface of the rollable flat mat but maintains any stiffness, rigidity and/or flexural modulus within any plane parallel to the plane defined by the surface of the rollable flat mat.

In a preferred embodiment the rollable flat mat is made of a polyolefin material in the form of a film. The thickness of the film may vary from, for example, 0.5 mm-10 mm, preferably 1 mm-8 mm, 1.5 mm-7 mm, 2 mm-6 mm, 2.5 mm-5 mm, 3 mm-4 mm. Preferably the film material is an extruded film comprising a polyolefin material and, optionally, one or more additional thermoplastic polymers and/or thermoset polymers. In a preferred embodiment the film material is a biaxially oriented film for example having been stretched in a machine direction and/or a transverse direction upon extrusion. A stretched film is especially desirable for the differential physical properties in different axes of the plane of the surface of the film. For example, flexural modulus, bendability or flexibility may have certain values along an axis representing a length and different values along an axis representing a width and still further values along an axis representing a height. This differential stiffness in turn provides structure that may be helpful for forming a canopy section that is upwardly extendable out of the plane of the rollable flat mat without drooping in certain sections, e.g., the canopy can generally hold its width when in an expanded and elevated configuration. Alternately, or in combination, portions of the rollable flat mat may be selectively modified to include one or more additives or rigidity-enhancing agents such as fibrous materials or inserts which function to provide support and further maintain lifting of particular portions of the canopy section when in an expanded or deployed configuration.

The arch support functions as a tension member when in an expanded configuration. The arch support may be made of materials such as carbon fiber, fiberglass, metal or other thermoplastic or thermoset polymer materials. The arch support may be a single uninterrupted hollow or solid member or may be in sections that are mechanically connectable to one another and/or expandable to form a total length longer than at least one of a width dimension or a length dimension of the rollable flat mat.

The rollable flat mat may have one or more layers. In one embodiment of the invention the rollable flat mat has at least two layers with a top layer, e.g., a layer that is expanded upwardly and exposed to sunlight when the sun shelter is in a deployed configuration when the upwardly deployable area portion is elevated. Upon expansion or lifting of the upwardly deployable area portion the second layer of the rollable flat mat remains in contact with a substrate upon which the sun shelter is anchored or placed. The first layer of the rollable flat mat is therefore completely cut through with a pattern representing the pattern for the upwardly deployable area portion. In other embodiments the rollable flat mat has additional layers for, for example, water resistance, cushioning, abrasion resistance, or ease of cleaning. In a preferred embodiment of the invention the rollable flat mat is only a single layer of a thermoplastic biaxially oriented polyolefin film.

FIG. 1 shows a preferred embodiment of the invention. The collapsible sun shelter 1 includes an arch support 2 supporting a canopy section 3 in a deployed or expanded configuration. The canopy section 3 is part of a rollable flat mat 4 which includes a floor area portion 6 and an upwardly deployable area portion 5. It is the upwardly deployable area portion 5 that expands and elevates to form the canopy section 3. Upon expansion and deployment of the canopy section an at least partially covered area is formed to provide shelter from direct exposure to sunlight or solar rays. The rollable flat mat 4 includes anchor points 7 for the arch support. The arch support openings 7 may provide access and passage of ends of the arch support to connect to an anchor or anchorage point on a substrate such as the ground. Alternately, the arch support openings may be integral with a connecting device or connecting means by which the end of the arch support is anchored in place. The rollable flat mat also includes at least one mat anchor point 8 permitting fastening or securing of the rollable flat mat in a collapsed or expanded configuration to a substrate. The mat anchor points 8 may be an opening to permit insertion of an anchoring device such as a nail or tent pole or may be integral with an extension which extends outwardly from the back face of the rollable flat mat to engage or penetrate or be secured in a substrate surface or matrix. An optional storage area is shown as 9 in FIG. 1. The optional storage area may provide stowage capacity for portions of the expandable sun shelter or may provide stowage or other work spaces for individuals utilizing the sun shelter for sun screening.

Expansion and collapse of the collapsible sun shelter is shown in FIG. 2. FIG. 2A shows a configuration of the sun shelter in its expanded or deployed form. The arch support 2 spans a length of the rollable flat mat 4 from one arch support opening to another 7. Although the arch support openings in FIG. 1 are roughly parallel and equally spaced from ends of the rollable flat mat 4, in other embodiments the arch support openings are at different locations such that more or less of the floor area portion of the rollable flat mat remains in an expanded configuration.

Expansion of the rollable flat mat is achieved by inserting one end of the arch support 2 into an anchor point through an arch support opening 7 then connecting the arch support to one or more connection points on the upwardly deployable area portion of the rollable flat mat then lifting the upwardly deployable area portion and finally anchoring the second end of the arch support into the second arch support opening. In order to remain in an upright and expanded configuration, the rollable flat mat is preferably made from a material which permits upward expansion and bending of the upwardly deployable area portion while maintaining resistance to bending backward or sagging of any portion of the canopy section.

Figure 2A:
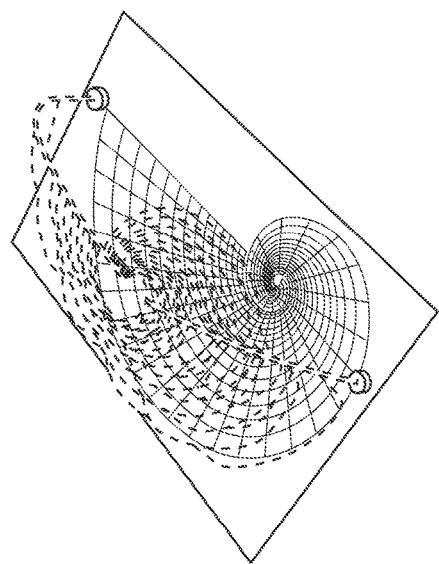
FIG. 2A shows a perspective of an expandable sun shelter from a high elevation.
Figure 2B:
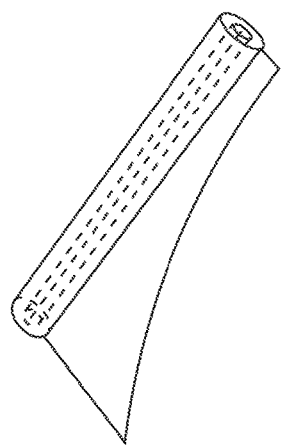
FIG. 2B shows a high level elevation perspective of a sun shelter demonstrating partial collapse.

FIG. 2B shows a first step during collapse of the collapsible sun shelter. One or more ends of the arch support 2 is removed from the arch support openings such that it is no longer anchored. This in turn causes the canopy section 3 to lose elevation and drop to a plane defined by the top surface of the rollable flat mat 4.

Figure 2C:
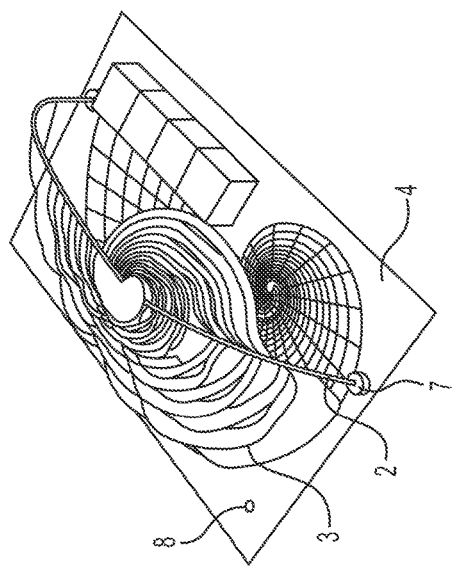
FIG. 2C shows a canopy-type sun shelter in a collapsed mat-based form.
Figure 2D:
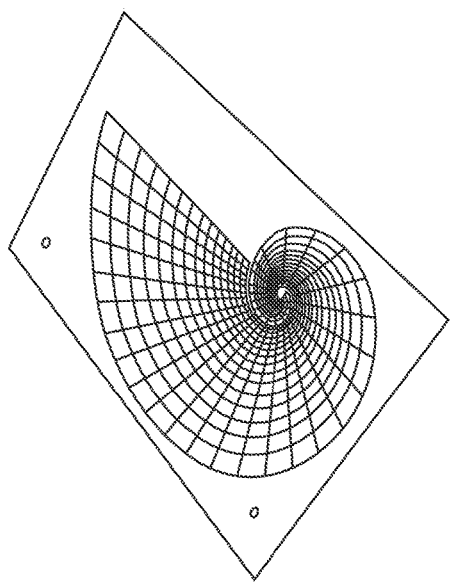
FIG. 2D shows a collapsed canopy in a rolled configuration.

FIG. 2C shows the rollable flat mat in a collapsed and flat configuration whereby the upwardly deployable area portion is no longer deployed and now has a top surface substantially within the plane defined by the top surface of the rollable flat mat. Upon removal of any mat anchor points 8, the rollable flat mat may be further retracted and stowed by rolling (FIG. 2D).

FIG. 3 provides a top view of different steps of deployment and collapse of the collapsible sun shelter. The top view shown in FIG. 3A shows the perimeter and total area of the rollable flat mat 4. The arch support 2 is shown in a transverse position covering substantially the length or width of the rollable flat mat. The mat anchor points 8 are shown at top positions of the rollable flat mat. However, more than two mat anchor locations may be present having locations at other corners of the rollable flat mat or at other positions.

FIG. 3B again shows a top view of the collapsible sun shelter during a first step of collapse. The arch support 2 is removed from the arch support openings 7 to thereby initiate descent of the canopy section of the collapsible sun shelter. FIG. 3C shows a top view of the collapsible sun shelter after removal of the arch support after which the canopy section and upwardly deployable area portion is flat in a plane of the rollable flat mat and is no longer upwardly extendable.

FIG. 3D shows a top view of the rollable flat mat in a rolled configuration.

Figure 4A:
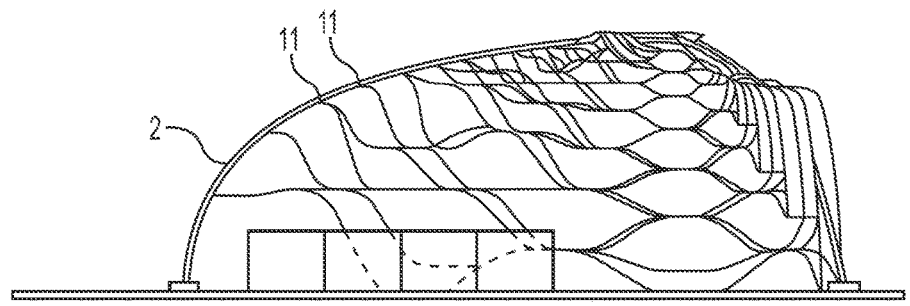
FIG. 4A shows a street level side view of an expandable sun shelter in an expanded configuration.

FIG. 4A shows a front view of the collapsible sun shelter in a deployed configuration. The area towards the front is at least partially covered by a portion of the upwardly deployable area portion of the rollable flat mat that is elevated. Points of contact between the canopy section and the arch support are shown 11. From a front view it is evident that the canopy section 3 extends from the plane of the rollable flat mat upward to an apex defined by the highest most connecting point between the canopy section and the arch support at its apex. Preferably, when in an expanded or deployed form, the collapsible sun shelter has a height of from 0.5 to 5 meters, preferably 1 to 4 meters, more preferably from 2 to 3 meters or about 1.5 to about 2.5 meters in height from the plane of the rollable flat mat to the apex or highest point of the canopy section in a deployed configuration.

Figure 4B:
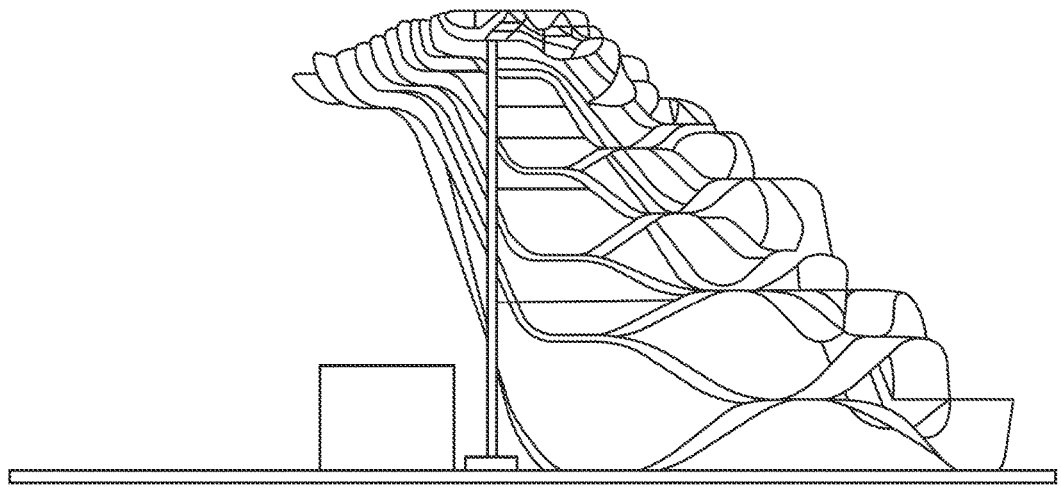
FIG. 4B shows a street level front view of an expandable canopy-based sun shelter in an expanded configuration.

FIG. 4B shows a side view of the collapsible sun shelter 1 when in a deployed or expanded configuration. It is evident that expansion of the upwardly deployable area portion forms a covered area both in front of and behind the arch support when viewed transversely down the length or width of the rollable flat mat. As is shown in FIG. 4B, a back portion of the canopy section serves as a wall or privacy barrier whereas a front section remains open for entry and egress of individuals.

Figure 5:
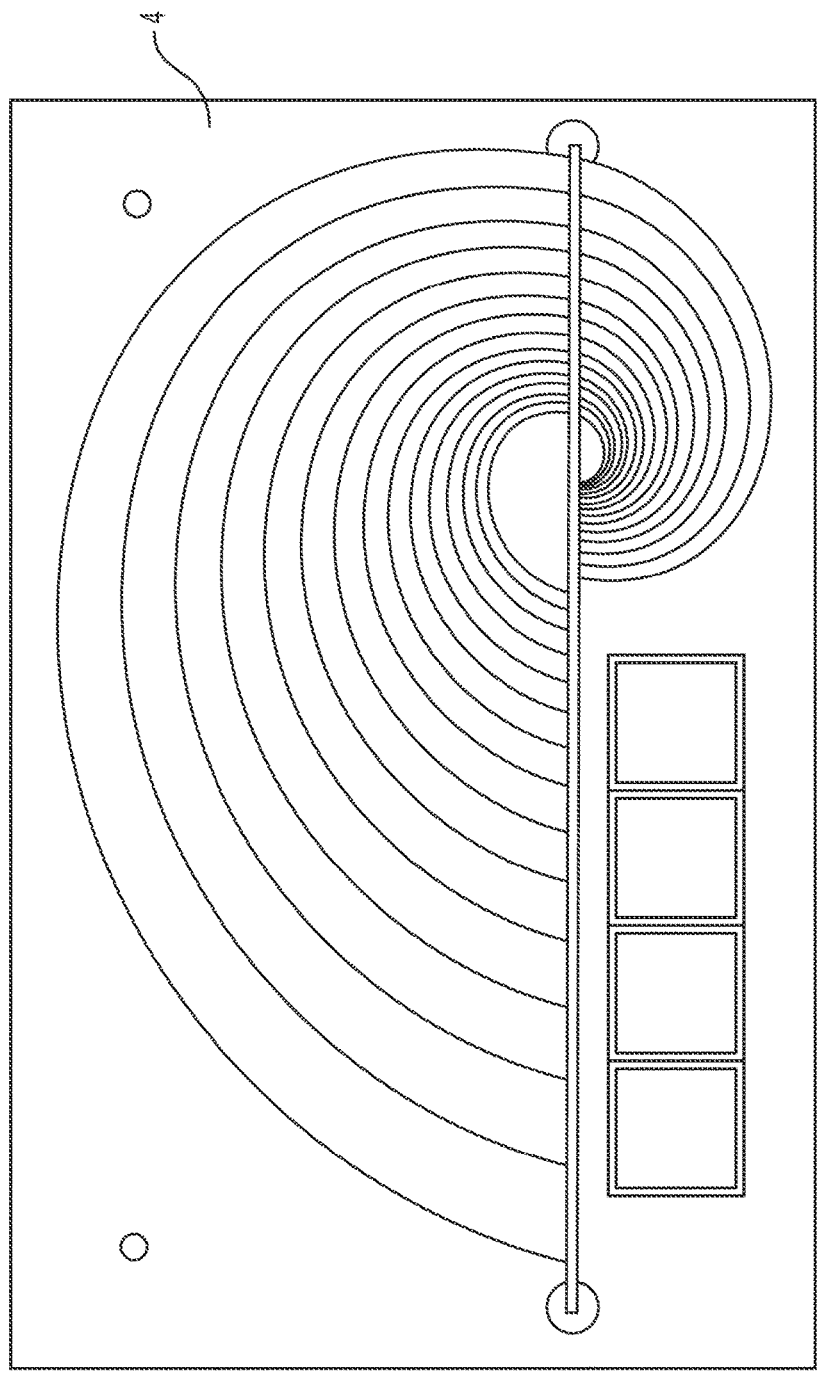
FIG. 5 shows a top view of an expandable canopy-based sun shelter in an expanded configuration.

FIG. 5 shows a top view of embodiments of the collapsible sun shelter. A preferred width of the rollable flat mat 4 is from 1 to 5 meters, preferably 2 to 4 meters, from 2 to 3 meters or about 2.5 meters when the broadest width of the perimeter of the cutout representing the upwardly deployable area portion is measured. The total width of the rollable flat mat is preferably from 1 to 6 meters, 2 to 5 meters, 4 to 3 meters or about 3 meters. The total length of the rollable flat mat is from 3 to 10 meters, preferably 4 to 9 meters, 5 to 8 or 6 to 7 meters. The total width of the perimeter of the upwardly deployable area portion is generally about 1 to 5.5 meters, 2 to 5 meters, 3.5 to 4 meters or about 4.5 meters. Generally both the width of the perimeter of the upwardly deployable area portion is about 90%, about 95%, about 80% or about 85% of the total width or length of the rollable flat mat.

Figure 6:
FIG. 6 shows an expandable sun shelter in an expanded configuration located in a community setting together with optional storage bins.

FIG. 6 shows a deployment of the collapsible sun shelter of the present disclosure in a community setting. Lifting of the upwardly deployable area portion of the rollable flat mat creates a covered portion which provides shelter from direct exposure to sunlight. The rollable flat mat remains in place and is resistant to moving by two mat anchor points.

Obviously, numerous modifications and variations of the present invention are possible in light of the above teachings. It is therefore to be understood that within the scope of the appended claims, the invention may be practiced otherwise than as specifically described herein.

The invention claimed is:

1. A collapsible sun shelter, comprising:
a single transverse arch support, and
rollable flat mat,
wherein the rollable flat mat is configured to expand to include a canopy section having a spiral-like pattern,
wherein the rollable flat mat comprises a floor area portion, an upwardly deployable area portion, at least two mat anchor points and at least two arch support openings,
wherein the upwardly deployable area portion is defined by an outer perimeter passing through at least one layer of the rollable flat mat such that the upwardly deployable area portion remains connected with the floor area portion when the upwardly deployable area portion is extended upwardly in a deployed configuration,
wherein the upwardly deployable area portion of the canopy section comprises at least one point of contact and/or point of attachment with the single transverse arch support.

2. The collapsible sun shelter according to claim 1, wherein the single transverse arch support has an apex height of from 0.3 to 0.9 of the longest dimension of the outer perimeter of the upwardly deployable area portion.

3. The collapsible sun shelter according to claim 1, wherein the rollable flat mat is made from a thermoplastic material.

4. The collapsible sun shelter according to claim 1, wherein the rollable flat mat is made from a biaxially oriented extruded film of a polyolefin material.

5. The collapsible sun shelter according to claim 1, wherein the upwardly deployable area portion is in contact with a plurality of points of attachment with the single transverse arch support.

6. The collapsible sun shelter according to claim 1, wherein the spiral-like pattern forms flat portions of the upwardly deployable area portion at different elevations between the surface of the rollable flat mat and the apex of the arch support.

7. The collapsible sun shelter according to claim 1, wherein the rollable flat mat has a thickness of from 2 to 6 mm.

8. The collapsible sun shelter according to claim 1, comprising a non-removable transverse arch support made of spring steel wire, attached to the upwardly deployable area portion.

9. The collapsible sun shelter according to claim 8, wherein the upwardly deployable area portion is configured to pop open when the mat is unrolled.

* * * * *